UNITED STATES PATENT OFFICE.

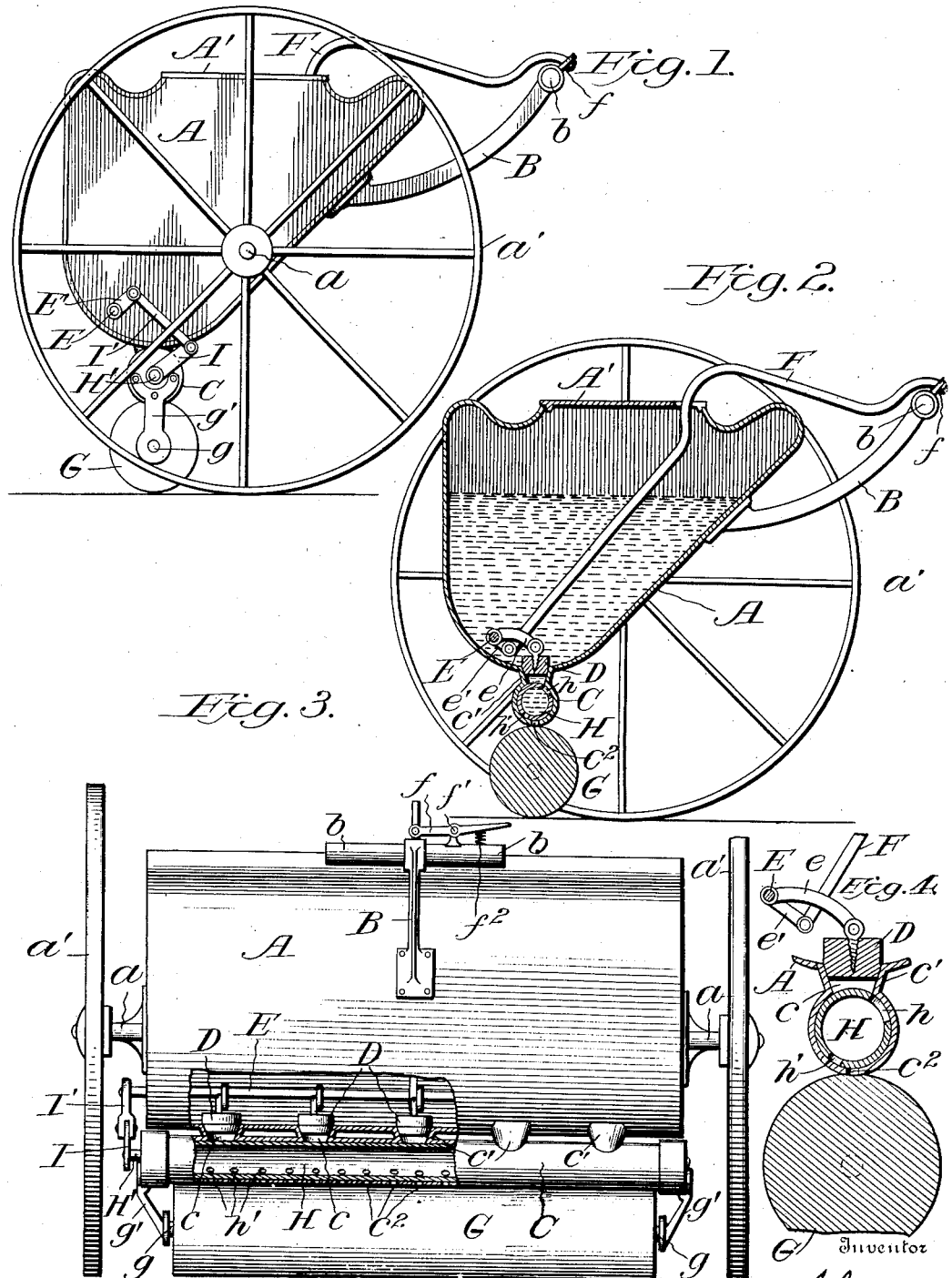

RICHARD W. SHELY, OF CHICAGO, ILLINOIS.

MACHINE FOR APPLYING FLUIDS TO SURFACES.

No. 826,897.　　　Specification of Letters Patent.　　　Patented July 24, 1906.

Application filed April 17, 1905. Serial No. 256,151.

*To all whom it may concern:*

Be it known that I, RICHARD W. SHELY, of Chicago, in the county of Cook and State of Illinois, have invented certain new and useful Improvements in Machines for Applying Fluids to Surfaces; and I hereby declare that the following is a full, clear, and exact description thereof, reference being had to the accompanying drawings, which form part of this specification.

This invention is an improved machine for appying liquids to floors or floor-surfaces, and is especially designed for distributing soap-water or lye upon floors previous to scrubbing them, and is particularly useful in large buildings where there is a great area of floor-space to be scrubbed.

This machine is adapted to distribute the water or cleansing fluid uniformly over the floors without the fluid becoming fouled before being applied.

The invention comprises, in brief, a tank or receptacle for the fluid mounted upon wheels, a distributing-pipe connected with this tank and located adjacent to the floor, valve mechanism for regulating the flow of said fluid into said distributing-pipe, and means, preferably a roller, for receiving fluid from said distributing-pipe and applying the same upon the surface of the floor.

In the accompanying drawings I have illustrated a preferred form of the machine and will describe the invention with reference thereto and refer to the claims for summaries of the essential features and parts of the invention for which protection is desired.

In the drawings, Figure 1 is a side elevation of the complete apparatus. Fig. 2 is a transverse section thereof. Fig. 3 is an end view, partly in section; and Fig. 4 is a detail of the valve-operating devices.

A designates a tank of any suitable dimensions, preferably constructed of metal and provided with trunnions $a$, by which it is supported upon wheels $a'$. This tank has a handle B, provided with hand-pieces $b$, by which it can be readily manipulated by the operator. The tank can be filled through an opening in the top, closed by a cover $A'$.

Located beneath the tank is a distributing-pipe C, which has a series of openings $c$ in its top, communicating, through nipples $c'$, with the lower part of the tank. The nipples $c'$ are closable by stopple-valves D within the tank and pivotally connected to arms $e$ on a rock-shaft E, extending longitudinally through the tank, said shaft E projecting outside of the tank at one end through a suitably-closed aperture in the end thereof. By means of rock-shaft E the valves D may be simultaneously raised or lowered, so as to open or close the nipple $c'$, and thus admit the fluid to or shut it off from the pipe C.

Shaft E is controllable to open or close the valve by means of a rod F, the lower end of which is pivotally connected to an arm $e'$ on shaft E, and its upper end is connected to one end of a hand-lever $f$, pivoted at $f''$ on the handle, so that it can be conveniently operated by the thumb or hand of the operator moving the machine. A spring $f^2$ may be arranged to normally hold the hand-lever in position to keep the valves closed. This spring may be located at any other suitable point where it will act to hold the valves closed.

The pipe C has numerous perforations $c^2$ in its bottom, through which the fluid escapes onto the applying device G, which in this instance is preferably a roller or cylinder extending from the distributing-pipe C to the floor and adapted to receive fluid from the distributing-pipe and apply it in a thin uniform layer onto the floor or surface over which the machine is moved. The roller G is located in advance of the axes of the wheels, so as to partly support the tank.

The roller G is provided with trunnions $g$, which are journaled in brackets $g'$, which may be attached to an adjacent part of the machine or to the end of the distributing-pipe C, as shown. Preferably within the distributing-pipe C is placed a cylindrical valve H, which is provided with openings $h$ in its upper side, adapted to register with the openings $c$ in the distributing-pipe C when the valve H is in one position. Said valve is also provided with perforations $h'$, adapted to register with the perforations $c^2$ in pipe C when the openings $h$ register with the opening $c$. By moving the valve H longitudinally or axially the openings may be thrown out of register, and thus the valve H can be used to control the supply of water onto the roller G in combination with or independently of the valves D. I prefer to employ both sets of controlling means, but do not wish to limit myself thereto.

I prefer to operate valve H by rotating it on its axis, and for this purpose the valve is provided with a trunnion $H'$ on one end, which projects through one end of pipe C and is provided with a crank-arm I, connected by a link I' with an arm E' on the projecting end of shaft E, the connections being such that when shaft E is rocked to open valves D it simultaneously causes valve H to rock, so as to bring the openings therein into register with the openings in the pipe C, and consequently the fluid passes freely and in a well-distributed manner to the roller G, and when the shaft E is rocked, so as to close the valves D, valve H is simultaneously rocked, so as to cut its openings out of register with the openings in the pipe C.

The distributing device G enables the water or fluid to be spread evenly and uniformly over the floor or surface instead of being deposited in streams thereover and insures the liquid contacting with every part of the floor without necessitating the use of an oversupply of liquid thereon, and thus prevents the waste of liquid and overdeposits thereof on the floors.

I prefer to use the roller as above stated, but do not wish to be restricted thereto, except where I may specifically mention it in the claims.

While particularly adapted for moistening floors, the machine may also be used for applying oils, paints, varnishes, &c., on surfaces to be covered thereby, and I do not limit myself to its use for cleansing purposes only.

Having thus described my invention, what I claim as new, and desire to secure by Letters Patent, is—

1. In combination, a wheeled tank, a perforated distributing-pipe thereunder communicating therewith, a series of valves within the tank adapted to close communication between the tank and said distributing-pipe; a rock-shaft provided with arms connected to said valves, and means for regulating said shaft controllable by the hand of the operator; with a distributing device adapted to receive liquid from said distributing-pipe and apply it to the surface over which the machine is moved.

2. In combination, a liquid-holding tank, a perforated distributing-pipe thereunder communicating therewith, a tubular valve within said distributing-pipe having perforations and openings adapted to register with the inlet and outlet of the said pipe; and a rock-shaft and connections for actuating said valve so as to open or close the water-passages through said distributing-pipe; with a distributing-roller adapted to receive water from said distributing-pipe and apply it to the floor.

3. In combination, a wheeled tank, a cylindrical distributing-pipe and communicating with the tank through a series of openings and having a series of perforations in its bottom; valves within the tank closing said openings; and a rock-shaft for operating said valves and a hand-lever and connections for rocking said shaft; and a distributing device adapted to receive fluid from said pipe and apply it to the floor.

4. In combination, a wheeled tank, a cylindrical distributing-pipe thereunder, communicating with the tank through a series of openings and having a series of perforations in its bottom; a series of valves within the tank closing said openings; a rock-shaft and connections for opening and closing the valves; a cylindrical tubular valve within said pipe; a connection between said rock-shaft and said tubular valve for operating the latter; and a distributing device adapted to receive fluid from said pipe and apply it to the floor.

5. In a machine for applying fluids to floors, the combination of a tank having valved fluid-outlets, and a valve mechanism for simultaneously opening and closing the valves of said outlets; with a longitudinal roller disposed beneath the tank, and located in advance of the axes of the wheels so as to partly support the tank, said roller being adapted to receive fluid from the outlets and apply the same to the floor.

6. In combination, a wheeled tank adapted to be propelled by hand, fluid-outlets in the lower part of the tank, valves closing said outlets, a hand-controlled valve mechanism for simultaneously opening and closing said outlet-valves; and a longitudinal roller disposed beneath the tank, and located in advance of the axes of the wheels, so as to partly support the tank, said roller being adapted to receive fluid from the outlets and apply the same to the floor.

7. In combination, a wheeled tank, a distributing-pipe connected therewith provided with perforations, valves for regulating the passage of liquid to and from said pipe, and a distributing-roller located in advance of the axes of the wheels, and adapted to partly support the tank, said roller receiving the liquid from said distributing-pipe and applying it to the surface over which the machine is moved.

8. In combination, a wheeled tank adapted to contain liquid and provided with liquid-outlets in its bottom, a perforated distributing-pipe communicating with said outlets, valves for controlling the passage of liquid through said distributing-pipe, and valve-operating means controllable by the hand of the operator; with a distributing-roller located in advance of the axes of the wheels, and adapted to partly support the tank, said roller receiving liquid from said distributing-pipe and applying it to the surface over which the machine moves.

9. In combination, a wheeled tank, a perforated distributing-pipe thereunder, communicating therewith, valve mechanism to close communication between the tank and said distributing-pipe; and means for regulating said valve mechanism controllable by the hand of the operator; and a distributing-roller located in advance of the axes of the wheels, and adapted to partly support the tank, said roller receiving liquid from said distributing-pipe and applying it to the surface over which the machine is moved.

10. In combination, a liquid-holding tank, a perforated distributing-pipe communicating therewith, a tubular valve within said distributing-pipe having perforations and openings adapted to register with the inlet and outlet of the said pipe; and means for actuating said valve so as to open or close the water-passages through said distributing-pipe; with a distributing-roller adapted to partly support the tank and to receive liquid from said distributing-pipe and apply it to the floor.

11. In combination, a tank, outlet-valves, a perforated distributing-pipe connected with said outlet-valves, a tubular valve in said pipe for regulating the passage of liquid to and from said pipe, and a distributing device receiving the liquid from said distributing-pipe and applying it to the surface over which the machine is moved.

12. In combination, a tank provided with outlets in its bottom, valves controlling the outlets, a perforated distributing-pipe communicating with said outlets, a tubular valve in said pipe controlling the passage of liquid thereto and therefrom, and a distributing device adapted to receive liquid from said distributing-pipe and apply it to the surface over which the machine moves.

In testimony that I claim the foregoing as my own I affix my signature in presence of two witnesses.

RICHARD W. SHELY.

In presence of—
R. F. MUNSELL,
M. J. KILEY.